United States Patent [19]

Bihler et al.

[11] 4,419,800

[45] Dec. 13, 1983

[54] METHOD OF FORMING A CAGE FOR FRUSTO-CONICAL ROLLER BEARINGS

[75] Inventors: Otto Bihler; Reiner Augenstein, both of Halblech, Fed. Rep. of Germany

[73] Assignee: Otto Bihler Maschinenfabrik GmbH & Co. K.G., Halblech, Fed. Rep. of Germany

[21] Appl. No.: 227,137

[22] Filed: Jan. 21, 1981

[30] Foreign Application Priority Data

Jan. 25, 1980 [DE] Fed. Rep. of Germany ....... 3002688

[51] Int. Cl.³ .............................................. B21D 53/12
[52] U.S. Cl. ................................ 29/148.4 C; 308/218
[58] Field of Search ................... 29/148.4 C, 149.5 R, 29/148.4 R, 149.5 DP; 308/218

[56] References Cited

U.S. PATENT DOCUMENTS

| | | |
|---|---|---|
| 1,124,481 | 1/1915 | Long . |
| 1,169,469 | 1/1916 | Dunning .......................... 29/148.4 C |
| 1,446,487 | 2/1923 | Timken . |
| 1,693,550 | 11/1928 | Delaval-Crow ............... 29/148.4 C |
| 1,781,241 | 11/1930 | Ness . |
| 1,794,772 | 3/1931 | Hughes .......................... 29/148.4 C |
| 2,677,449 | 5/1954 | Wavak ........................... 29/148.4 C |
| 3,310,351 | 3/1967 | Ortregen ............................ 308/217 |

FOREIGN PATENT DOCUMENTS

| | | |
|---|---|---|
| 309658 | 12/1915 | Fed. Rep. of Germany . |
| 2416320 | 11/1974 | Fed. Rep. of Germany . |
| 69727 | 5/1969 | German Democratic Rep. . |
| 1386534 | 12/1964 | France . |

Primary Examiner—Howard N. Goldberg
Assistant Examiner—V. K. Rising
Attorney, Agent, or Firm—Toren, McGeady and Stanger

[57] ABSTRACT

A cage for a frusto-conical roller bearing is formed of a punched flat material strip so that an elongated bar extends along one side of the punched strip with a number of bars extending transversely outwardly from the elongated bar with the ends of these bars being free. As a result of the punching step a number of windows are formed closed on three sides but open on the fourth side opposite the elongated bar. The transversely extending bars are bent out of the plane of the elongated bar. When the punched strip is free into a ring the free ends of the transversely extending bars are located on a circle having a different diameter than the diameter into which the elongated bar is rolled. Another bar is rolled into a ring and is connected to the free ends of the transversely extending bars.

15 Claims, 7 Drawing Figures

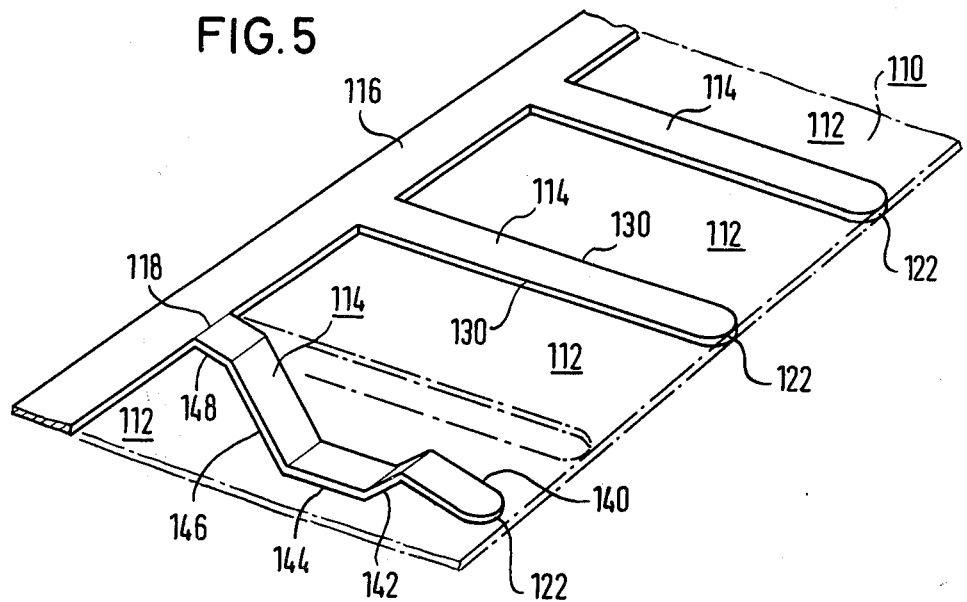
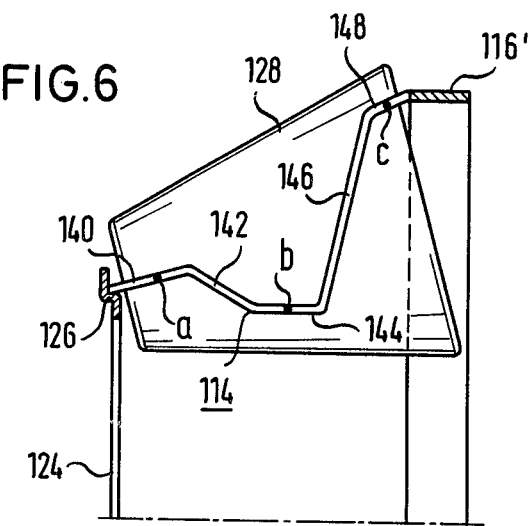

METHOD OF FORMING A CAGE FOR FRUSTO-CONICAL ROLLER BEARINGS

SUMMARY OF THE INVENTION

The present invention is directed to a method of forming a cage for frusto-conical roller bearings by punching windows from an elongated linear flat material strip with transversely extending bars separating adjacent windows. The transversely extending bars are deformed and the punched strip is then rolled into a ring with the ends of the ring being connected together at the junction point, if necessary.

A process of this type for forming a cage is known from the German Offenlegungsschrift No. 24 16 320. In this known process, the windows are punched out in the usual way so that both of the edges of the strip form elongated bars with each window being enclosed on each side. The bars are then bent out of the plane of the material strip and subsequently the material strip is folled to form a ring closed at the junction point. The opposite ends of the cage have the same diameter corresponding to the length of the elongated bars, that is, corresponding to the length of the material strip. The bars extending transversely of the elongated bars are bent out of the cylindrical surface defined by the end rings and these transversely extending bars are shaped to correspond to the geometry of the frustro-conical roller bearing for which the cage is formed.

Nothing is known about the proven durability of such cages during use. In most cases it is not acceptable that the end rings of the cage, formed by the elongated bars, have the same diameter. In any case, such an arrangement greatly restricts the use of the cage formed in this manner for frusto-conical roller bearings of different geometry.

The present invention is directed to a method of forming cages for frusto-conical roller bearings in a simple and material saving manner so that the cages can be adapted without restriction to frusto-conical roller bearings of the most varied geometry.

In accordance with the present invention, the windows for the cage are punched out of an elongated flat material strip so than an elongated bar is formed only on one side of the strip with transversely extending bars projecting outwardly from the elongated bar and being free at their outer ends. Accordingly, the windows are closed on only on three sides, one side by the elongated bar and on the other two sides by an adjacent pair of transversely extending bars. The transversely extending bars are deformed so that their free ends are offset from the plane of the elongated bar in the radial direction of the ring to be formed so that, after the strip is rolled, the free ends of the transversely extending bars are located on a circle having a diameter different from the diameter of the circle or ring formed by the elongated bar. Subsequently, the free ends of the transversely extending bars are connected to a separately formed end ring and preferably the connection is made by welding.

In this method embodying the present invention, as is evident, the diameter of the end rings of the cage can be freely selected, since the diameter of the subsequently attached end ring can be selected in any ratio with respect to the diameter of the end ring formed by the elongated bar when the material strip is rolled.

The method of the present invention also differs in an especially advantageous manner from the methods known to-date.

Up until the present time, cages for frusto-conical roller bearing were deep-drawn in a number of stages on presses, that is, conical cups were produced after which the bottoms of the cups were cut off. Next, pockets or windows were cut into the ring formed from the cup and the bars remaining between the windows were stamped. Tools required to carry out this method are often subject to breakdowns. As a result the manufacturing costs are in an unfavorable ratio to the price that can be achieved. In most instances the punching out of the windows and the stamping is performed with separate tools which tends to reduce the manufacturing costs and limits the breakdown of the tools, however, in such a procedure the method of forming the cages is very inefficient. It is also disadvantageous in this known process that there is an enormous loss of material which results from cutting the bottom of the formed cups. Another disadvantage is that the material grain lies in a single direction due to rolling and, during deep drawing of the sheet metal into a cup form, the grain direction assumes many varied directions within the cup. As a result, a number of different strength factors are present in the individual bars formed during the punching operation on the cup.

Another disadvantage experienced in this known process involves the difficulty in finishing the edges of the bars formed in the punching operation. After punching the bar edges are very rough, because during punching a part of the material strength breaks down. These rough edges must be finished by stamping or a similar procedure. Stamping as a means of finishing the bar edges is especially difficult when the material is already conically configured because of the cup-shaped formation. In accordance with the present invention it is much simpler to finish the edges of the bars, whether it is performed by stamping or another process, since it can be effected when the material strip is flat after the windows have been punched out. In the known process it is not possible to achieve ideal roller guidances in the cage and, in addition, it is especially difficult to maintain a lubricating film, however, in the method of the present invention the edges of the bars can be finished so that they form almost ideal guide surfaces for the frusto-conical rollers and the provision of a lubricating film is particularly facilitated. Accordingly, wear of the rollers and also of the cage occurs to a lesser degree in cages produced in accordance with the method of the present invention.

In the method of the present invention, the end ring to be attached to the free ends of the transversely extending bars, can be produced by bending a flat material so that no material loss occurs.

To facilitate centering the end ring on the free ends of the transversely extending bars, stops can be provided on the end ring and/or the bars. To provide radial stops it is possible to provide the end ring with a crank shape.

There is exceptional freedom available in the selection of the shape of the transversely extending bars located between the two end rings. Special care must be taken when the transversely extending bars are formed that the frusto-conical rollers are optimally guided in the circumferential direction, that is, they are fixed as exactly as possible between adjacent transversely extending bars because of the principle that with better lateral guidance of the rollers, there is less possibility that the rollers will oscillate laterally and less likelihood that the rollers will act like a brake due to any displacement.

As an example, the transversely extending bars can be bent at or close to the connecting point with the elongated bar formed in the strip so that the transversely extending bars extend linearly from this connecting point to their free ends, as viewed in a section containing the axis of the completed cage, that is, essentially on the conical surface defined by the axes of the conical rollers viewed as part of the completed frusto-conical roller bearing.

It is not necessary, however, that the transversely extending bars and completed cage extend for their entire length in one conical surface. In particular, if the conical rollers are to be supported in the radial direction and to facilitate assembly, another configuration of the transversely extending bars might be selected. For instance, the transversely extending bars could be bent so that they are located in the completed bearing on both sides of a conical surface defined by the axes of the frusto-conical rollers, that is radially inwardly and radially outwardly of the conical surface.

In a practical and promising embodiment of the present invention, the transversely extending bars are bent so that in a completed frusto-conical roller bearing starting from the smaller diameter end of the cage, the bars extend first in the conical surface defined by the axes of the frusto-conical rollers and then proceed radially inwardly to a section extending parallel to a surface line of frusto-conical rollers located radially inwardly of the conical surface formed by the axes of the frusto-conical rollers. From this radially inward location the bar is then bent radially outwardly to a section which extends parallel to a surface line of the frusto-conical rollers located radially outwardly of the conical surface formed by the axes of the frusto-conical rollers.

While it is possible to design the transversely extending bars as viewed in the radial direction of a completed cage, with straight edges, with such an arrangement usually only ppor guidance of the rollers is achieved. It is also possible, however, to cut the edges of the transversely extending bars, preferably when the windows are being punched from the strip material, so that, considering the geometry of the completed bearing, the frusto-conical rollers are guided in the desired manner in the circumferential direction of the cage and, if appropriate, in the radial direction of the cage. In this way it is possible to achieve the desired line and point contacts between the roller and the edges of the bars.

To limit wear as much as possible, it is desirable if the frusto-conical rollers (or other rollers) do not contact sharp edges, rather the edge surfaces of the bar contacting the rollers should be as tangential as possible. The ability to finish the edges of the transversely extending bars while the material strip is still in the flat condition, such as by stamping, is a particular advantage compared to the known methods in which the windows are formed only after the completion of the formation of the conical cup so that the edges of the bars can only be finished after the completion of the shaping of the cup. Particular note should be taken that when the windows are punched out of the conical cups, the punching operation is usually effected either radially inwardly or radially outwardly. Punching in the radial direction whether inwardly or outwardly, leads to a broken surface which can only be finished with difficulty by stamping. Such finished edges are not particularly suitable for guiding the rollers in the sense of providing tangential contact between the edge surfaces of the bars and the roller periphery. In the present invention, however, there is unusual freedom in the manner in which the punching operation as well as the stamping operation can be performed, since both punching and stamping are carried out when the material strip is in the flat condition.

During the punching operation it is possible that the elongated bar forming the strip can form either the larger or smaller diameter end ring, however, for bending purposes it is preferred if the elongated bar is the one which forms the larger diameter end of the cage.

The punching of the windows stamping of the edge surfaces, bending of the transversely extending bars, rolling of the material strip, connecting of the ends of the material strip, and attaching of the end ring at the free end of the transversely extending bars, can be performed on a known wire and strip punch press and bending machine.

To obtain a high degree of accuracy in forming the cage, the transversely extending bars formed in the material strip can be centered before the end ring is welded to them. During centering a secondary deformation can be afforded so that any possible wear of the punching and stamping tools can be compensated. The centering and possibly the secondary deformation is performed preferably with a device having a convex-conical internal tool with recesses with the recesses aligned with the windows in the strip, and a concave-conical external tool with slides also aligned with the windows so that the slides can be inserted through the windows into the recesses in the internal tool.

The present invention also relates to a cage for frusto-conical roller bearings with end rings with the bars connecting the end rings forming the windows in the cage. The feature of this cage for frustro-conical roller bearings, essential to the invention, is that the transversely extending bars are formed integrally with one end ring and are connected with the other end ring, preferably by welding.

The various features of novelty which characterize the invention are pointed out with particularity in the claims annexed to and forming a part of this disclosure. For a better understanding of the invnetion, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 5 is a perspective view similar to FIG. 1, however, showing one of of the transversely extending bars bent in a different shape;

FIG. 6 is a partial sectional view through a cage, similar to FIG. 3, with the cage being formed from the material strip illustrated in FIG. 5, and with a frusto-conical roller inserted into the cage.

DETAIL DESCRIPTION OF THE INVENTION

Figure 1:
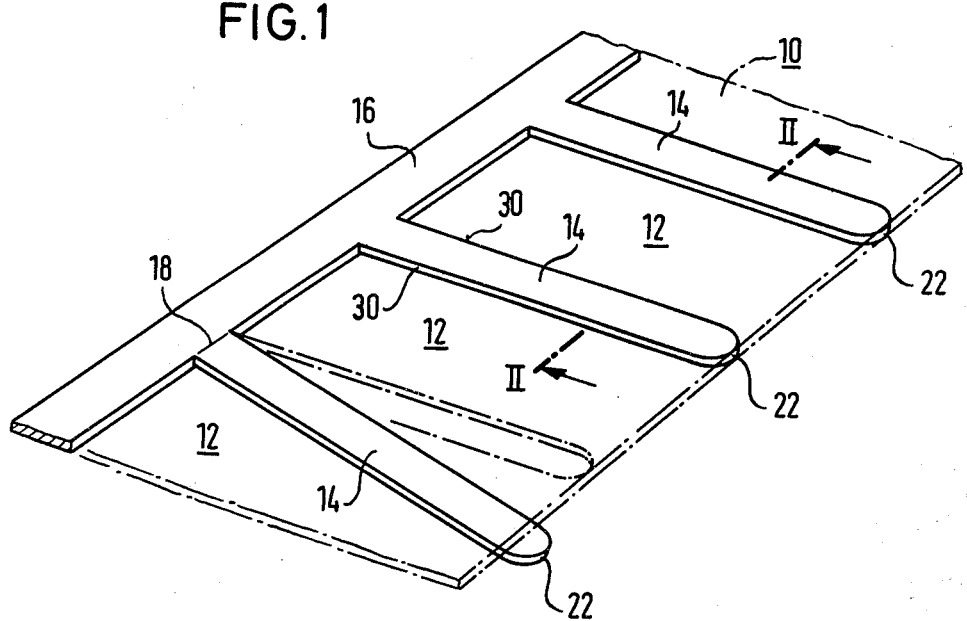
FIG. 1 is a perspective view of a linearly extending flat strip of material from which windows have been punched leaving one elongated bar and a number of transversely extending bars with one of the transversely extending bars having been bent.
Figure 3:
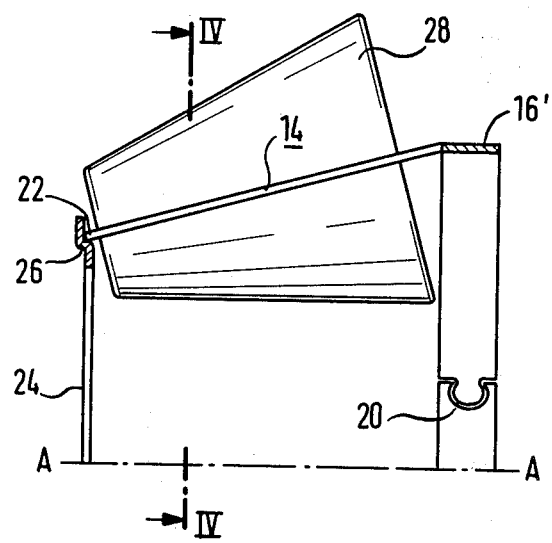
FIG. 3 is a partial sectional view through a completed cage with a frusto-conical roller inserted into the cage.

In FIG. 1 a steel plate strip 10 is shown after a punching operation, the complete outline of the strip is shown partly in full line and partly in phantom line. Windows 12 have been punched out of the steel plate strip 10 so that transversely extending bars 14 extend along and outwardly from one edge of an elongated bar 16. As can be seen each window 12 is defined along one side by the elongated bar 16, along two other sides by a pair of adjacent transversely extending bars 14 with the fourth side remaining open. At the left-hand end of FIG. 1, the transversely extending bar 14 is bent downwardly about its base along the edge of the elongated bar 16 during the formation of the cage, all of the transversely extending bars 14 are bent relative to the elongated bar 16 in the same manner as the left-hand end transversely extending bar shown in FIG. 1. The elongated bar 16 is rolled, that is, bent from its flat shape into a ring and forms one of the end rings of the cage. In FIG. 3 the end ring 16' is shown formed from the elongated bar 16 and providing the larger diameter end ring for the cage. When the elongated bar 16 is rolled, that is bent to form the ring 16', the transversely extending bars 14 form a portion of a cone about the axis A—A, note FIG. 3. The adjoining ends of the elongated bar 16 forming the ring 16' are welded together or are interconnected in a form-locking manner as indicated at 20 in FIG. 3, or the ends can be both welded and connected together in a form-locking manner. In the case of lower grade cages, it is sufficient under certain circumstances if the abutting or adjoining ends of the elongated bar merely contact one another. As is shown in FIG. 3, the free ends 22 of the transversely extending bars 14 are welded to another end ring 24 forming the smaller diameter end of the cage. As shown in FIG. 1, the free ends 22 of the transversely extending bars 14 are rounded or could be pointed so that during welding, which is usually provided by means of a current passage, initially a small current passage resistance occurs which leads to considerable heating of the parts at the location of the current passage and subsequently results in the welding of the parts. As can be seen in FIG. 3, end ring 24 is bend at right angles at location 26 so that the free ends 22 of the transversely extending bars 14 are fixed at least in the radial direction of the end ring 24. It is also possible to stamp recesses in the end ring for the free ends 22 of the transversely extending bars 14 so that the bars 14 are also fixed in the circumferential direction.

Punching the windows 12 out of the strip 10 and bending the transversely extending bars 14 about their bases 18 can be effected in a single work step in a wire and strip bending machine and punch press. Further, rolling that is, bending of the elongated bar 16 into a ring can also take place in this machine, for instance by pressing the elongated bar continuously by means of pressure tools around a mandrel whose outer diameter corresponds to the inner diameter of the resulting ring. Subsequently, the end ring 24 can be welded to the opposite ends of the transversely extending bars 14 on the same machine.

In FIG. 3 a frusto-conical roller 28 is illustrated to show the relative position of the bars 14 with respect to the rollers. In FIG. 3 the geometry of the cage and of the frusto-conical rollers, held in the bearing, is selected so that the bars rest approximately in the conical surface defined by the axes of the frusto-conical rollers. Though not shown in FIG. 3, it is presumed that the transversely extending bars rest in line contact with the roller 28. In FIG. 1 the transversely extending bars 14 are illustrated with the edges 30 parallel to one another. Due to the bending of the transversely extending bars 14 about their bases 18 and the subsequent rolling of the elongated bar 16 to form the end ring 16', the spaces between the adjoining bars 14 is reduced in an approximation to the resulting window shape which is necessary in view of the conical shape of the rollers 28. It is also possible, if the bending and rolling operation does not result in the desired window shape, to cut or trim the edges 30 of the transversely extending bars 14 in advance, preferably when the windows 12 are punched out, so that, following bending and rolling, the shape of the window is provided which results in a line contact of the frusto-conical rollers 28 with the edges 30.

Figure 2:
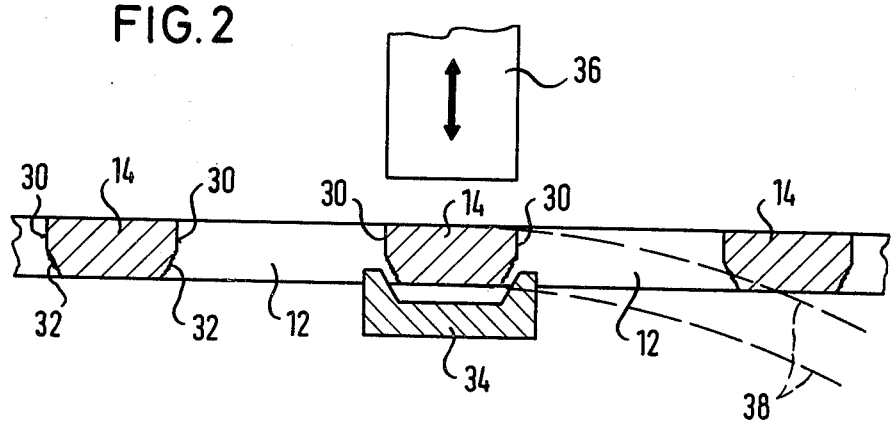
FIG. 2 is a sectional view taken along the line II—II of FIG. 1 during the step of finishing the edges of a transversely extending bar in a stamping operation.
Figure 4:
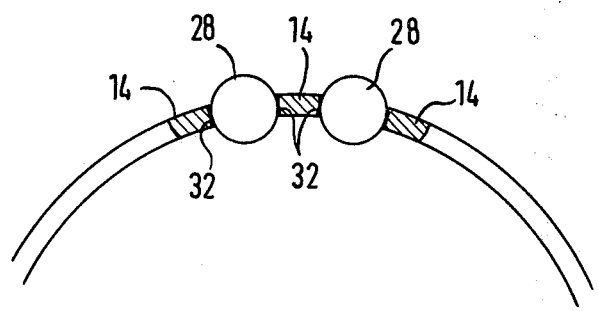
FIG. 4 is a sectional view, on a reduced scale, taken along the line IV—IV in FIG. 3.

In the sectional showing in FIG. 2, the broken surfaces 32 at the edges 30 of the transversely extending bars 14 are evident and these surfaces result from the punching out of the windows 12, that is, when the material located within the window opening is punched from the top to the bottom. These broken surfaces, as is shown in FIG. 2, can be stamped smooth in the flat material strip with the aid of a bottom die 34 and an upper die 36. Further, the subsequent bending of the transversely extending bars 14 is shown by the arcs 38, displayed in broken line. In FIG. 4 the stamped broken surfaces 32 whose angle of convergence is changed during the bending of the ring, can adapt tangentially to the peripheral surface of the frusto-conical rollers 28 so that ideal guidance conditions are afforded which are favorable for the formation and maintenance of a lubricating film.

In FIGS. 5 and 6 another embodiment of the invention is illustrated. Parts similar to those shown in FIGS. 1 and 3 are provided with the same reference numerals, however, with the addition of the number 100.

As distinguished from the first described embodiment, in the embodiment of FIGS. 5 and 6, the transversely extending bar 114 is subjected to multiple bending, note the left-hand bar 114 shown in FIGS. 5 and 6 as compared to the bar 14 shown in FIGS. 1 and 3. In this bending operation a first section 140 is provided extending from the smaller diameter end ring 124 and this section 140 is located in the conical surface defined by the axes of the frusto-conical rollers. A second section or step 142 extends radially inwardly to a third section 144 located radially inwardly of the conical surface defined by the axes of the frustro-conical rollers and parallel to the surface lines of the rollers 128. A fourth section or step 146 extends radially outwardly and terminates in a fifth section 148 located radially outside the conical surface formed by the axes of the frusto-conical rollers and extending parallel to the surface lines of the conical rollers 128. The section 148 terminates in the ring 116' with which it is formed integrally.

With regard to the embodiment illustrated in FIG. 6, in consideration of the showing in FIG. 5, it can be seen that a three-point support is afforded with the three points of the support shown at a, b and c, though the actual contact may be a line contact and not a point contact.

Cutting the edges of the transversely extending bars 114 in the embodiment disclosed in FIGS. 5 and 6 can be effected in such a way that, while taking into consideration the geometry of the frusto-conical roller bearing, the desired contact conditions between the edges 130 of the bars 114 and the frusto-conical rollers 128 are obtained. For the sake of clarity, the trimming of the edges 130 is not shown in FIG. 5.

Figure 7:
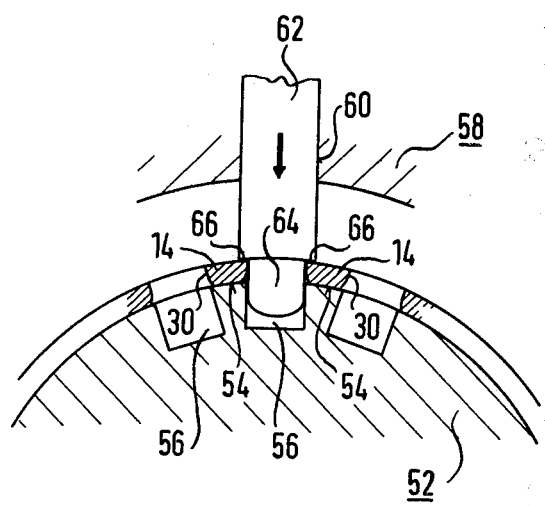
FIG. 7 is a partial sectional view displaying a device for centering the cage before the welding of the end ring.

In FIG. 7 a centering device is displayed for adjusting the cage before welding end ring 24 into the correct position. Further, the device effects corrections in the stamping of the edges 30, if necessary. The centering device is made up of a central convex-conical centering tool 52 with contact surfaces 54 for the crossbars 14. Between the contact surfaces 54, recesses 56 are formed into the tool 52. An outer tool 58 cooperates with the inner or centering tool 52. Guides 60 mounted in the outer tool 58 contain slides 62 having fingers 64 which extend between the transversely extending bars 14 and fit into the recesses 56 so that the bars 14 are fixed in an exact position in the circumferential direction by the fingers and in the radial direction by the shoulders 66 before the end ring 24 is welded to the transversely extending bars.

The adjusting or centering device illustrated in FIG. 7 and the welding unit can also be installed in the strip or wire bending and punch press.

With regard to the state of the art, reference is made to German Pat. No. 309,658 from which it is known (FIG. 9) to provide flat material strips with windows, open at an elongated edge, so that only one elongated bar is provided with transversely extending bars projecting laterally outwardly from the elongated bar. In this arrangement, however, the bars are not connected by another end ring.

With regard to FIG. 6, by means of the 144, 148 of the transversely extending bar 114, a radial support of the frusto-conical rollers is provided in the radially inward and radially outward directions. Usually an appropriate trimming of the edges 130 is necessary, at least in the region of the section or steps 146 a narrowing of the bars 114 is required, while the sections 144, 148 must be correspondingly wider. In such an arrangement, the frusto-conical rollers 128 must be spring-mounted in the windows or pockets in the cage.

While specific embodiments of the invention have been shown and described in detail to illustrate the application of the inventive principles, it will be understood that the invention may be embodied otherwise without departing from such principles.

What is claimed is:

1. Method of producing a cage for frusto-conical roller bearings comprising punching out windows from an elongated flat material first strip so that bars extending transversely of the elongated direction of the first strip remain between the windows, deforming the transversely extending bars, and bending the punched out strip to form a ring around the axis extending transversely of the elongated direction of the first strip and parallel to the flat surface of the first strip, wherein the improvement comprises punching out the flat material first strip so that a first bar extends along one elongated edge of the first strip with a number of elongated second bars extending transversely of the first bar and disposed in spaced relation in the elongated direction of the first strip and with the ends of the second bars spaced outwardly from the first bar being free so that the first bar and a pair of adjacent second bars form three sides of a window with the fourth side being open, deforming the second bars out of the plane of the first bar with the free ends of the second bars being offset relative to the plane of the first bar in the radial direction of the ring to be formed from the punched first strip whereby during the bending of the punched first strip and forming the first bar in the shape of a ring the free ends of the second bars are located on a circle having a diameter different from the diameter of the ring formed by the first bar, forming another end ring for connection to the free ends of the second bars, connecting the another end ring to the free ends of the second bars, and forming the another end ring from a flat material second strip by bending the second strip around an axis arranged to align with the bending axis of the first strip so that the flat surface of the second strip extends transversely of the bending axis of the second strip.

2. Method, as set forth in claim 1, including the step of forming stops on at least one of the another end ring and the second bars for fixing the free ends of the second bars to the another end ring.

3. Method, as set forth in claim 2, including the step of forming a crank-like bend in the flat surface of the another end ring as a radial stop for the free ends of the second bars.

4. Method, as set forth in claim 1, including the steps of trimming the edges of the second bars for guiding the frusto-conical rollers in at least one of the circumferential direction and the raidal direction of the cage.

5. Method, as set forth in claim 4, including trimming the edges of the second bars during the punching out of the windows.

6. Method, as set forth in claim 4, including the step stamping the edges of the second bars after punching for forming edge surfaces extending substantially tangentially to the surfaces of the frusto-conical rollers in the completed bearing.

7. Method, as set forth in claim 5, wherein the first bar formed in the first strip forms the larger diameter end ring of the cage when the strip is bent into a ring.

8. Method, as set forth in claim 7, including the step of centering the free ends of the second bars of the bent first strip relative to the smaller diameter end ring.

9. Method, as set forth in claim 8, including the step of effecting secondary deformation of the second bars during the centering operation and supporting the second bars with a convex-conical internal tool having recesses aligned with the windows formed between adjacent second bars and an external tool having slides aligned with the windows and inserting the slides through the windows into the recesses for centering the second bars.

10. Method as set forth in claim 1, including bending the first bar into a member consisting of a cylindrical sleeve.

11. Method of producing a cage for frusto-conical roller bearings comprising punching out windows from an elongated flat first strip so that bars extending transversely of the elongated direction of the first strip remain between the windows, deforming the transversely extending bars, and bending the punched out strip to form a ring around an axis extending transversely of the elongated direction of the first strip and parallel to the flat surface of the first strip, wherein the improvement comprises punching out the flat material first strip so that a first bar extends along one elongated edge of the first strip with a number of elongated second bars extending transversely of the first bar and disposed in spaced relation in the elongated direction of the first strip and with the ends of the second bars spaced outwardly from the first bar being free so that the first bar and a pair of adjacent second bars form three sides of a window with the fourth side being open, deforming the second bars out of the plane of the first bar with the free ends of the second bars being offset relative to the plane of the first bar in the radial direction of the ring to be formed from the punched first strip whereby during the bending of the punched first strip and forming the first bar in the shape of a ring the free ends of the second bar are located on a circle having a diameter different from the diameter of the ring formed by the first bar, forming another end ring for connection to the free ends of the second bars, connecting the another end ring to the free ends of the second bars, bending the second bars into a number of sections angularly disposed with regard to one another so that the entire length of the second bars do not extend on one conical surface.

12. Method, as set forth in claim 11 wherein in bending the second bars are shaped so that at spaced locations in the elongated direction thereof they are located radially inwardly and radially outwardly of the conical surface defined by the axes of the frusto-conical rollers of the frusto-conical roller bearing.

13. Method, as set forth in claim 12, including the steps of forming the first bar as a larger diameter end ring and the another end ring as the smaller diameter end ring, shaping the second bars into a plurality of angularly disposed sections with a first section extending from the smaller diameter end ring located in the conical surface defined by the axes of the frusto-conical rollers, a second section extending radially inwardly from the end of the first section spaced from the smaller diameter end ring, a third section extending from the end of said second section spaced from said first section and disposed parallel to the surface line of a frusto-conical roller and located radially inwardly of the conical surface defined by the axes of the frusto-conical rollers, a fourth section extending radially outwardly from the end of the third section spaced from the second section to a location outwardly of the conical surface defined by the axes of the frusto-conical rollers and a fifth section extending from the end of the fourth section spaced from the third section and extending to the larger diameter end ring with the fifth section located radially outwardly from the conical surface defined by the axes of the frusto-conical rollers and extending parallel to the surface line of a frusto-conical roller.

14. Method of producing a cage for frusto-conical bearings comprising punching out windows from an elongated flat material first strip so that bars extending transversely of the elongated direction of the first strip remain between the windows, deforming the transversely extending bars, and bending the punched out first strip to form a ring around an axis extending transversely of the elongated direction of the first strip and parallel to the flat surface of the first strip, wherein the improvement comprises punching out the flat material first strip so that a first bar extends along one elongated edge of the first strip with a number of elongated second bars extending transversely of the first bar and disposed in spaced relation in the elongated direction of the first strip and with the ends of the second bars spaced outwardly from the first bar being free so that the first bar and a pair of adjacent second bars form three sides of a window with the fourth side being open, deforming the second bars out of the plane of the first bar with the free ends of the second bars becoming offset relative to the plane of the first bar in the radial direction of the ring to be formed from the punched first strip whereby during the bending of the punched first strip and forming the first bar in the shape of a ring the free ends of the second bars are located on a circle having a diameter different from the diameter of the ring formed by the first bar, forming another end ring for connection to the free ends of the second bars, connecting the another end ring to the free ends of the second bars, bending the second bars at a location extending along the edge of the first bar so that the second bars are bent out of the plane of the first bar and extend in a straight line from the location of the bend to the free ends thereof, and bending the second bars so that they are located on a conical surface defined by the axes of the frusto-conical rollers in a completed roller bearing.

15. Method of producing a cage for frusto-conical roller bearings comprising punching out windows from an elongated flat material first strip so that bars exteding transversely of the elongated direction of the first strip remain between the windows, deforming the transversely extending bars, and bending the punched out strip to form a ring around an axis extending transversely of the elongated direction of the first strip and parallel to the flat surface of the first strip, wherein the improvement comprises punching out the flat material first strip so that a first bar extends along one elongated edge of the first strip with a number of elongated second bars extending transversely of the first bar and disposed in spaced relation in the elongated direction of the first strip and with the ends of the second bars spaced outwardly from the first bar being free so that the first bar and a pair of adjacent second bars form three sides of a window with the fourth side being open, deforming the second bars out of the plane of the first bar with the free ends of the second bars becoming offset relative to the plane of the first bar in the radial direction of the ring to be formed from the punched first strip whereby during the bending of the punched first strip and forming the first bar in the shape of a ring the first ends of the second bars are located on a circle having a diameter different from the diameter of the ring formed by the first bar, forming another end ring for connection to the free ends of the second bars, connecting the another end ring to the free ends of the second bars.

* * * * *